A. KÖHLER.
LIQUID LENS SYSTEM.
APPLICATION FILED FEB. 9, 1912.
1,028,224. Patented June 4, 1912.
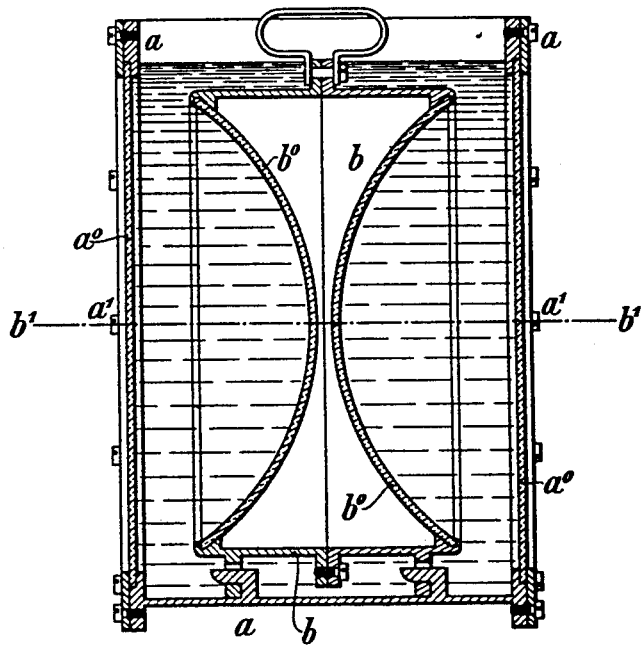
Witnesses:
Paul Krüger
Inventor:
August Köhler

UNITED STATES PATENT OFFICE.

AUGUST KÖHLER, OF JENA, GERMANY, ASSIGNOR TO THE FIRM OF CARL ZEISS, OF JENA, GERMANY.

LIQUID-LENS SYSTEM.

1,028,224. Specification of Letters Patent. Patented June 4, 1912.

Application filed February 9, 1912. Serial No. 676,680.

*To all whom it may concern:*

Be it known that I, AUGUST KÖHLER, a citizen of the German Empire, residing at Jena, Germany, have invented a new and useful Liquid-Lens System, of which the following is a specification.

The liquid-lens-system composed of two members according to the present invention is in two respects to be preferred to the usual disposition of two neighboring liquid-lenses. In the first place it permits of the employment of such liquids as become turbid and are liable to form a precipitate on the glass surfaces, as is *e. g.* the case with water; for with the new system the liquid may be conveniently changed and all glass surfaces in contact with the liquid easily cleaned. In the second place for transforming the system into another one with two other members it is only necessary to change a single one of the principal parts of the system. Of such principal parts there are three: two vessels and a liquid filling. The two opposite sides of either vessel are of glass, in the simplest case of uniform thickness and at any rate in their operative part bodies of revolution in relation to a common axis, therefore having surfaces that may also be plane or spherical. The two vessels are unequal in size, the smaller one being so disposed within the larger one that the axes of both pairs of glass sides coincide, that the effective parts therefore of the four glass sides by themselves form a centered optical system. When the remaining space of the outer vessel is filled with a liquid, a glass side of the inner and a glass side of the outer vessel form with a part of the filling a liquid-lens. The vessels may both be open at the top. If the inner one is closed, the air may be exhausted from it or it may be filled with a gas or gaseous mixture, *e. g.* again with air.

In the annexed drawing a constructional example of the new liquid-lens-system composed of two members is shown by a vertical section made along the optical axis.

The outer vessel $a$ is fitted with plane glass sides $a^0$, the inner vessel $b$ with spherico-concave glass sides $b^0$. The axis $a^1 a^1$ of the two plane sheets of glass $a^0 a^0$ and the axis $b^1 b^1$ of the two curved sheets of glass $b^0 b^0$ coincide. With a part of the liquid filling of the vessel $a$ the four glass sheets form two consecutive liquid-lenses, one plano-convex and the other convexo-plane.

I claim:

A liquid-lens-system comprising two vessels, the one inserted within the other, and a liquid filling the remaining space between the two vessels, each vessel having two opposite sides formed of glass as bodies of revolution in relation to an axis common to both vessels.

AUGUST KÖHLER.

Witnesses:
 PAUL KRÜGER,
 FRITZ LANDER.

Copies of this patent may be obtained for five cents each, by addressing the "Commissioner of Patents, Washington, D. C."